Figures 1, 2:
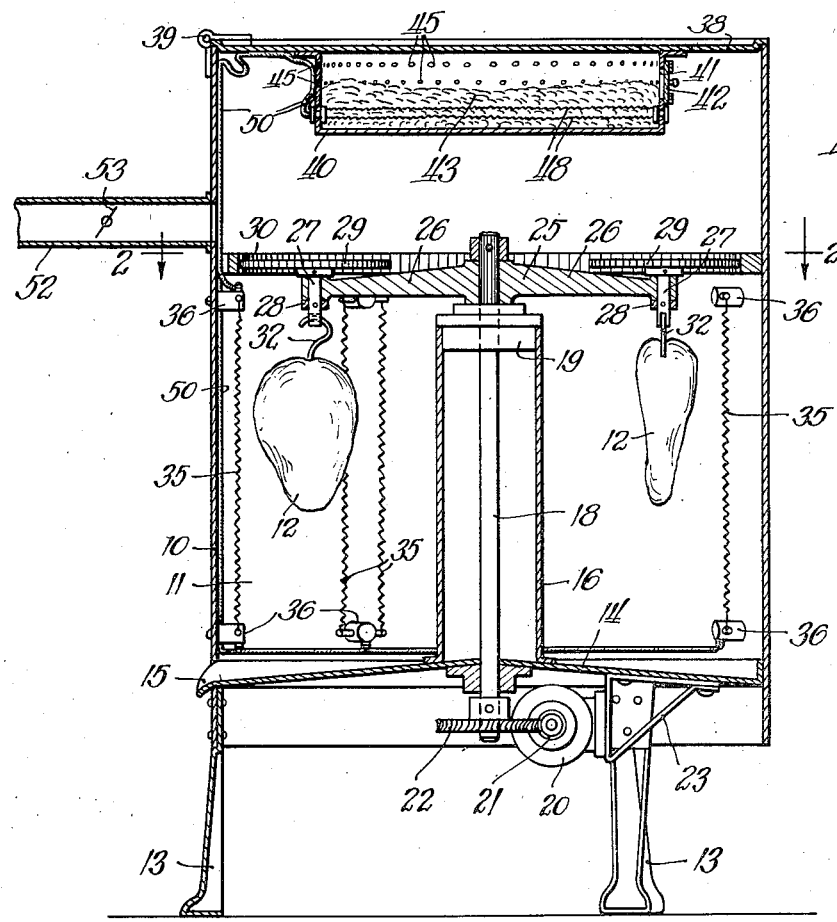

June 25, 1940.  A. D. STAFFORD  2,205,914

BARBECUING APPARATUS

Filed Oct. 24, 1938

Inventor:
Allen D. Stafford
By Brown, Jackson, Boettcher & Dienner
Attys.

Patented June 25, 1940

2,205,914

UNITED STATES PATENT OFFICE 2,205,914

BARBECUING APPARATUS

Allen D. Stafford, Chicago, Ill.

Application October 24, 1938, Serial No. 236,642

1 Claim. (Cl. 53—5)

My invention relates to an improved roasting or barbecuing apparatus, and has particular reference to the roasting or barbecuing of ham and similar articles of food.

The main object of my invention is to provide an improved roasting or barbecuing apparatus which will prepare roasted or barbecued ham or the like, flavored and having the characteristics heretofore produced only by barbecuing in the open with burning hickory or the like but without the loss of the hickory or other fumes which has heretofore resulted in barbecuing in the open, and with a more uniform application of the heat and hickory or other fumes to the ham or other article of food and with a better control of the resulting product than heretofore possible.

Further objects and advantages of my invention will appear from the following detailed description taken in connection with the accompanying drawing, in which:

Figure 1 is a vertical sectional view through a roasting or barbecuing apparatus embodying my present invention, taken on the line 1—1 of Figure 2; and Figure 2 is a fragmentary horizontal section taken on the line 2—2 of Figure 1.

The apparatus illustrated in the drawing, by way of example only, comprises a housing 10 defining an oven or enclosed chamber 11 in which the hams or other articles are roasted or barbecued. The housing 10 may be made of sheet metal and may have glass or other suitable windows (not shown) through which, for example, the hams indicated at 12 may be viewed from the outside or displayed during the cooking process.

The housing 10 may be supported in any suitable or preferred manner—for example, upon supporting legs 13. A bottom 14, secured, for example, marginally to the housing 10, defines the bottom of the enclosed chamber 11. This bottom 14 is preferably declined or sloped downwardly from the center to its outer periphery so that the grease or juices which drip from the hams as they are roasted will drain to the outer periphery of the bottom 14, from where same may be discharged through a spout 15.

At the center of the bottom 14 is mounted an upstanding inner support, by way of example, in the form of a sleeve 16 suitably secured in place at its lower end upon the bottom 14. A drive shaft 18 extends up centrally through the sleeve 16 and through the head member 19 at the upper end of the sleeve. This shaft 18 may be driven by any suitable or preferred means, for example, by an electric motor 20 having a worm 21 on the shaft thereof in mesh with a worm wheel 22 fixed on the drive shaft 18. The motor 20 is shown as suspended from the bottom 14 by means of a bracket 23, but it is to be understood that the driving motor may be mounted in any other suitable or preferred manner and that any other desired form of driving means may be employed.

Fixed upon the upper end of the shaft 18 for rotation therewith is a spider or combined ham-carrying and turning member 25. This member 25 may have support upon the head member 19. It has any suitable or preferred number of radiating arms 26, the five arms shown in the drawing being illustrative and not limiting. The outer end of each arm 26 carries for free rotation therein a short shaft 27. These shafts 27 may be retained against endwise displacement by flanges or collars 28 fixed thereon, and fixed upon the upper end of each shaft 27 is a planet gear 29.

The planet gears 29 mesh with a stationary internal ring gear 30 mounted within the housing 10. Rotation of the shaft 18 turns the spider 25 therewith and, as a result, the short shafts 27 revolve around the axis of the shaft 18, at the same time rotating axially because of the turning movement imparted thereto by the engagement of the planet gears 29 with the stationary internal gear 30. The hams 12 are detachably fastened to the lower ends of the shafts 27— for example, by hooks 32 or other suitable means—and, in the operation of the apparatus, revolve around the axis of the shaft 18, each ham 12 at the same time rotating about the axis of its shaft 27.

In order to provide a roasting or barbecuing heat for the hams 12 or other articles during the movements of same about the axis of the shaft 18 and individually about the axes of the shafts 27, a series of heating units or elements 35 are arranged exteriorly about the path of movement of the hams 12. These heating units 35 are shown as electric heating units in the form of electric resistance coils connected at their ends to suitable posts 36 on the inner surface of the housing 10. It is to be understood, however, that gas heaters or any other suitable or preferred form of heaters may be employed within the scope of my present invention.

In operation, the heat radiates inwardly from the heaters 35 upon the hams or other articles 12 in the movements of same within the chamber 11, and the movements of the articles 12 within the generally circumferential path defined by the heaters assures that the heat is uniformly applied thereto. Grease or juices which drip from the hams or other articles drain from the spout 15, and the inner surface of the housing 10 may be of a character to reflect the heat so as to concentrate same upon the articles 12. The top 38 is hinged at 39, and the hams or other articles 12 are placed within and removed from the housing 10 by swinging the top 38 to open position and introducing the hams or other articles 12 into the positions shown, or removing same therefrom through the open top of the housing and between the arms 26 of the spider or carrier 25.

A receptacle 40 is mounted within the interior of the housing 10, by way of example, upon the under side of the hinged top 38 and at the center thereof. This receptacle 40 has an opening 41 closed by a door or closure 42 adapted to be opened to permit introduction of hickory chips or the like into the receptacle 40 as shown at 43. The bottom of the receptacle 40 is preferably imperforate to prevent ashes from falling upon the apparatus and hams 12 underlying same, and the sides of the receptacle 40 are perforated at 45 to permit the smoke or fumes from the burning hickory chips to pass into and fill the chamber 11 with a dense fog or smoke of hickory fumes as the hams or other articles 12 are subjected to and cooked by the heat from the heaters 35.

For the purpose of burning the hickory chips 43 within the receptacle 40, I extend an electric resistance coil 48 through the bottom of the receptacle 40 and connect same by conductors 50 in circuit with the heating units 35. It is to be understood that any other suitable burner or igniter, such as a gas burner or igniter may be provided for burning the hickory chips in the receptacle 40 simultaneously with the cooking of the hams or other articles 12 by the heat from the heaters or burners 35. A flue 52 is provided for discharging the hickory fumes or smoke from the chamber 11 as desired, and this flue 52 has a damper 53 for controlling the discharge.

In carrying out the present invention with the hams or other articles 12 in place as shown and the circuit for the heaters 35 and resistance coil 48 closed and the motor 20 set in operation, the articles 12 turn about the axis of the shaft 18 and individually about the axes of the shafts 27. The burning of the hickory chips 43 creates a dense fog or smoke of hickory fumes which fills the chamber 11 and flavors the hams 12 in a manner heretofore accomplished only by barbecuing in the open with burning hickory. However, with the present invention, there is no loss of the hickory or other fumes such as heretofore resulted in barbecuing in the open. The burning of the hickory chips is not relied upon to supply the heat for cooking the hams, but this heat is supplied by the heaters or burners 35. As a result, hams prepared according to the present invention are flavored and have the characteristics heretofore produced by barbecuing in the open with burning hickory and, at the same time, there is no substantial loss of the hickory or other fumes, and a more uniform application of the heat and hickory or other fumes to the hams or other articles and a better control of the resulting product are secured.

I do not intend to be limited to the precise details shown or described.

I claim:

Apparatus for barbecuing articles of food comprising a housing defining a chamber open at one end, a cover pivoted to said housing for closing said chamber, heater means within said chamber for supplying a roasting or barbecuing heat, means for supporting the articles of food within said chamber and for turning the same around said heater means and about their own axes, receptacle means disposed in said chamber and suspended from said cover for holding flavoring means, said receptacle being removable from said chamber by the act of opening said cover, and igniter means for burning said flavoring means to create a relatively dense fog or smoke for flavoring the articles of food as same are subjected to the roasting or barbecuing heat from said heater means.

ALLEN D. STAFFORD.